United States Patent
Glain et al.

(10) Patent No.: US 12,030,640 B2
(45) Date of Patent: Jul. 9, 2024

(54) SEAT ARRANGEMENT, IN PARTICULAR FOR AN AIRCRAFT

(71) Applicant: Safran Seats, Plaisir (FR)

(72) Inventors: Arthur Glain, Boulogne Billancourt (FR); Oscar Ruiz, Versailles (FR); Charles Ehrmann, Les Bréviaires (FR)

(73) Assignee: Safran Seats, Plaisir (FR)

( * ) Notice: Subject to any disclaimer, the term of this patent is extended or adjusted under 35 U.S.C. 154(b) by 486 days.

(21) Appl. No.: 17/296,145

(22) PCT Filed: Nov. 5, 2019

(86) PCT No.: PCT/EP2019/080290
§ 371 (c)(1),
(2) Date: May 21, 2021

(87) PCT Pub. No.: WO2020/104189
PCT Pub. Date: May 28, 2020

(65) Prior Publication Data
US 2022/0017224 A1    Jan. 20, 2022

(30) Foreign Application Priority Data
Nov. 23, 2018  (FR) ...................... 1871732

(51) Int. Cl.
*B64D 11/06*    (2006.01)
(52) U.S. Cl.
CPC ...... *B64D 11/0601* (2014.12); *B64D 11/0604* (2014.12); *B64D 11/0641* (2014.12)
(58) Field of Classification Search
CPC ............ B64D 11/0601; B64D 11/0604; B64D 11/0641; B64D 11/0606; B64D 11/0602;
(Continued)

(56) References Cited

U.S. PATENT DOCUMENTS

2014/0283296 A1    9/2014  Jerome et al.
2016/0272323 A1*   9/2016  Carlioz .............. B64D 11/0602
(Continued)

FOREIGN PATENT DOCUMENTS

CN    104071338 A    10/2014
CN    106660637 A    5/2017
(Continued)

OTHER PUBLICATIONS

International Patent Application No. PCT/EP2019/080290, International Search Report (and English translation) and Written Opinion, dated Jan. 2, 2020.
(Continued)

*Primary Examiner* — Joshua J Michener
*Assistant Examiner* — Arfan Y. Sinaki
(74) *Attorney, Agent, or Firm* — Kilpatrick Townsend & Stockton LLP

(57) ABSTRACT

The present invention relates essentially to an arrangement of individual seats intended to be installed in an aircraft cabin and characterised in that the first seat faces inwards in the direction of the axis of the aircraft cabin and the second seat faces outwards away from the axis of the aircraft cabin and in that at least a portion of the first seat and of the corresponding first footwell are capable of defining at least a portion of a first bed surface which faces outwards away from the axis of the aircraft cabin and in that at least a portion of the second seat and of the corresponding second footwell are capable of defining at least a portion of a second bed surface which faces inwards in the direction of the axis of the aircraft cabin.

16 Claims, 3 Drawing Sheets

(58) Field of Classification Search
CPC .. B64D 11/0605; B64D 11/0643; B60N 2/34; B63B 2029/043
See application file for complete search history.

(56) References Cited

U.S. PATENT DOCUMENTS

| | | | |
|---|---|---|---|
| 2017/0129612 A1 | 5/2017 | Seibt et al. | |
| 2018/0265201 A1 | 9/2018 | Carlioz et al. | |
| 2018/0281969 A1* | 10/2018 | Lee | B60N 2/0292 |
| 2019/0248497 A1* | 8/2019 | Ersan | B64D 11/0601 |

FOREIGN PATENT DOCUMENTS

| | | |
|---|---|---|
| CN | 107873011 A | 4/2018 |
| WO | 2015155687 A1 | 10/2015 |
| WO | 2018078374 A1 | 5/2018 |
| WO | 2018078376 A1 | 5/2018 |
| WO | 2018178246 A1 | 10/2018 |

OTHER PUBLICATIONS

China Patent Application No. 2019800767866, Notice of Allowance, dated Oct. 12, 2023.
China Patent Application No. 2019800767866, Office Action, dated Apr. 26, 2023.

\* cited by examiner

SEAT ARRANGEMENT, IN PARTICULAR FOR AN AIRCRAFT

CROSS-REFERENCE TO RELATED APPLICATIONS

This application is a national stage application of International Patent Application PCT/EP2019/080290, filed on Nov. 5, 2019, which claims priority to France Patent Application No. 1871732, filed on Nov. 23, 2018, both of which are hereby incorporated by reference in their entireties.

The present invention relates to a seat assembly, especially for an airplane. The invention can be particularly advantageously applied to aircraft seats of the "business class" type. The invention can also be implemented with seats for other means of transport, such as, for example, seats for buses, trains or boats.

Airplane seats of "Business class" type offer passengers different comfort positions, from the "seating" position to a "lying" position, in which the seat defines a substantially horizontal lying surface for the passenger.

Document WO2015/155687 describes an assembly of individual seats to be installed in an aircraft cabin comprising a first seat and a second seat arranged facing one another. Each seat has a width, which is greater than a width of a conventional seat, so that it allows the passenger to sit in different orientations. For example, a passenger can be seated so as to have his/her body oriented in a direction, which is substantially parallel to the axis of the seat, or the passenger can be seated so as to have his/her body oriented with a non-zero angle up to 90 degrees with respect to the axis of the seat.

A central console is arranged between the first seat and the second seat. The central console comprises a first foot zone and a second foot zone, which are open in two opposite directions. The first foot zone is associated with the first seat facing the opening of the first foot zone. The second foot zone is associated with the second seat facing the opening of the second foot zone.

The invention aims to improve the filling density of the aircraft cabin with such a seat configuration by providing an assembly of individual seats to be installed in an aircraft cabin having a longitudinal axis, said assembly comprising:
- a first seat and a second seat arranged facing each other, each seat having an axis,
- a central console arranged between the first seat and the second seat, said central console comprising a first foot zone and a second foot zone,
- the first foot zone being associated with the first seat facing an opening of the first foot zone,
- the second foot zone being associated with the second seat facing an opening of the second foot zone, characterized in that the first seat faces inwardly towards the axis of the aircraft cabin and the second seat faces outwardly away from the axis of the aircraft cabin, so that an axis of the first seat forms a first non-zero angle with respect to a reference straight line parallel to the axis of the aircraft cabin and an axis of the second seat forms a second non-zero angle with respect to the reference straight line,
- at least part of the first seat and of the corresponding first foot zone being able to define at least part of a first bed surface facing outwardly away from the axis of the aircraft cabin, so that an axis of the first bed surface forms a third non-zero angle with respect to the reference straight line,
- at least part of the second seat and of the corresponding second foot zone being able to define at least part of a second bed surface facing inwardly towards the axis of the aircraft cabin, so that an axis of the second bed surface forms a fourth non-zero angle with respect to the reference straight line.

According to one embodiment, the first angle and the second angle are opposite one other, when these angles are measured with respect to the reference straight line.

According to one embodiment, the first angle and the second angle are equal to one another in absolute value.

According to one embodiment, an absolute value of the first angle or of the second angle is between 15 and 35 degrees and is preferably of the order of 25 degrees.

According to one embodiment, the third angle and the fourth angle are opposite one other, when these angles are measured with respect to the reference straight line.

According to one embodiment, the third angle and the fourth angle are equal to one another in absolute value.

According to one embodiment, an absolute value of the third angle or of the fourth angle is between 15 and 35 degrees and is preferably of the order of 25 degrees.

According to one embodiment, each seat has lateral sides substantially aligned with lateral sides of the other seat, so that, when viewed from above, the seat assembly has a parallelogram shape.

According to one embodiment, a seat and a corresponding foot zone are separated from one another by a space.

According to one embodiment, the space is intended to be filled at least in part by an attached cushion defining part of a bed surface.

According to one embodiment, the attached cushion is intended to be stored under a seating surface of a corresponding seat.

According to one embodiment, the seat being convertible between a seating position and a lying position, the space is intended to be filled at least in part by a seating surface of the seat, when the latter is in the lying position.

According to one embodiment, the first foot zone and the second foot zone are superimposed at least in part along the axis of the aircraft cabin.

According to one embodiment, the central console comprises a partition wall.

The invention also relates to an aircraft cabin characterized in that it comprises at least one row of seat assembly as defined above.

According to one embodiment, the row is formed by a successive alternation of a block of two seats and a central console, each block comprising two seats facing two opposite directions and arranged back to back.

The present invention will be better understood and other features and advantages will become apparent on reading the following detailed description including embodiments, given as illustrative examples, with reference to the accompanying figures, given as non-limiting examples, which could be used to completely understand the present invention and the description of its implementation and which could eventually contribute to its definition, in which.

It should be noted that, in the figures, the structural and/or functional elements common to the different embodiments may have the same references. Thus, unless otherwise stated, such elements have identical structural, dimensional and material properties.

Figure 1:
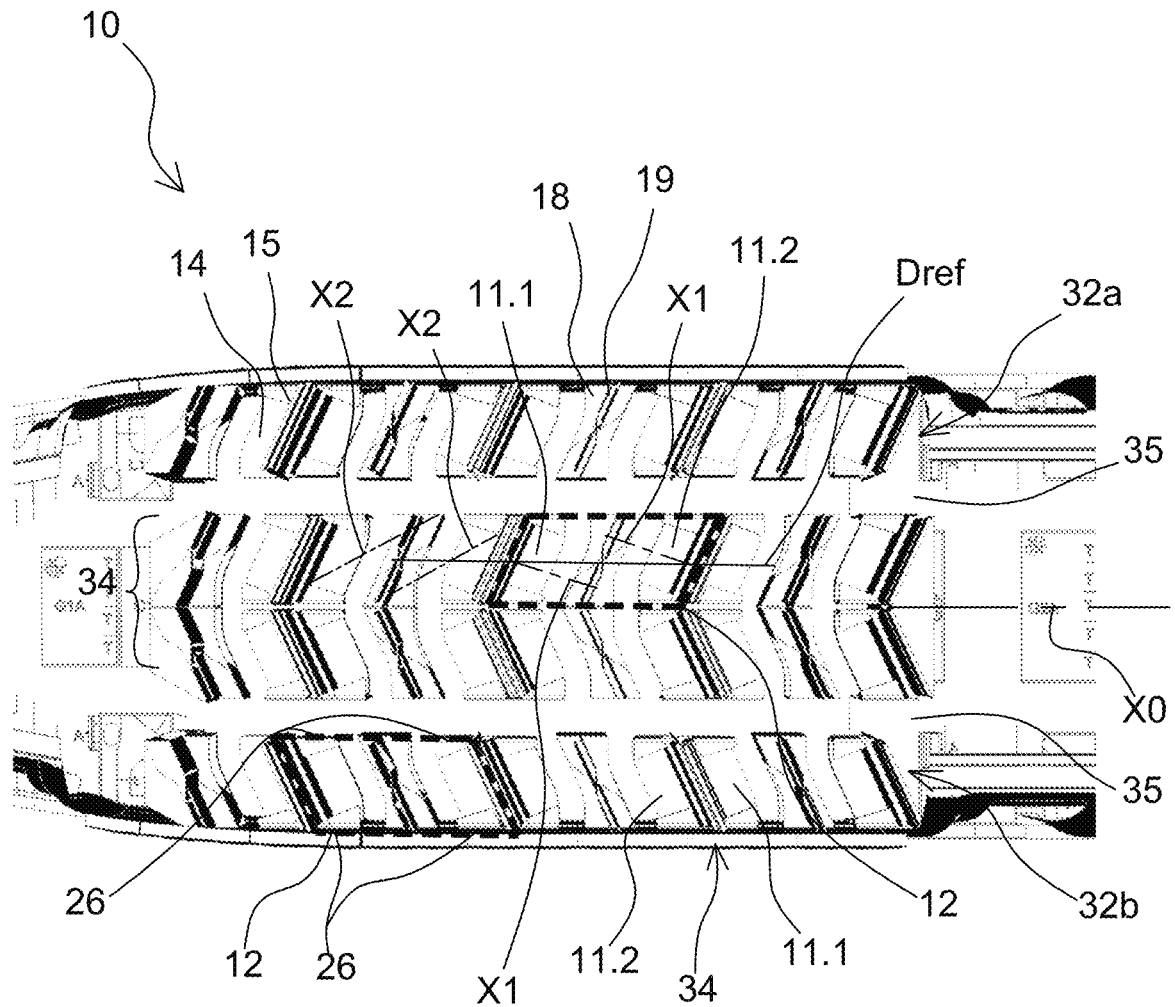
FIG. 1 is a top view of an aircraft cabin comprising assemblies of individual seat according to the present invention.
Figure 2:
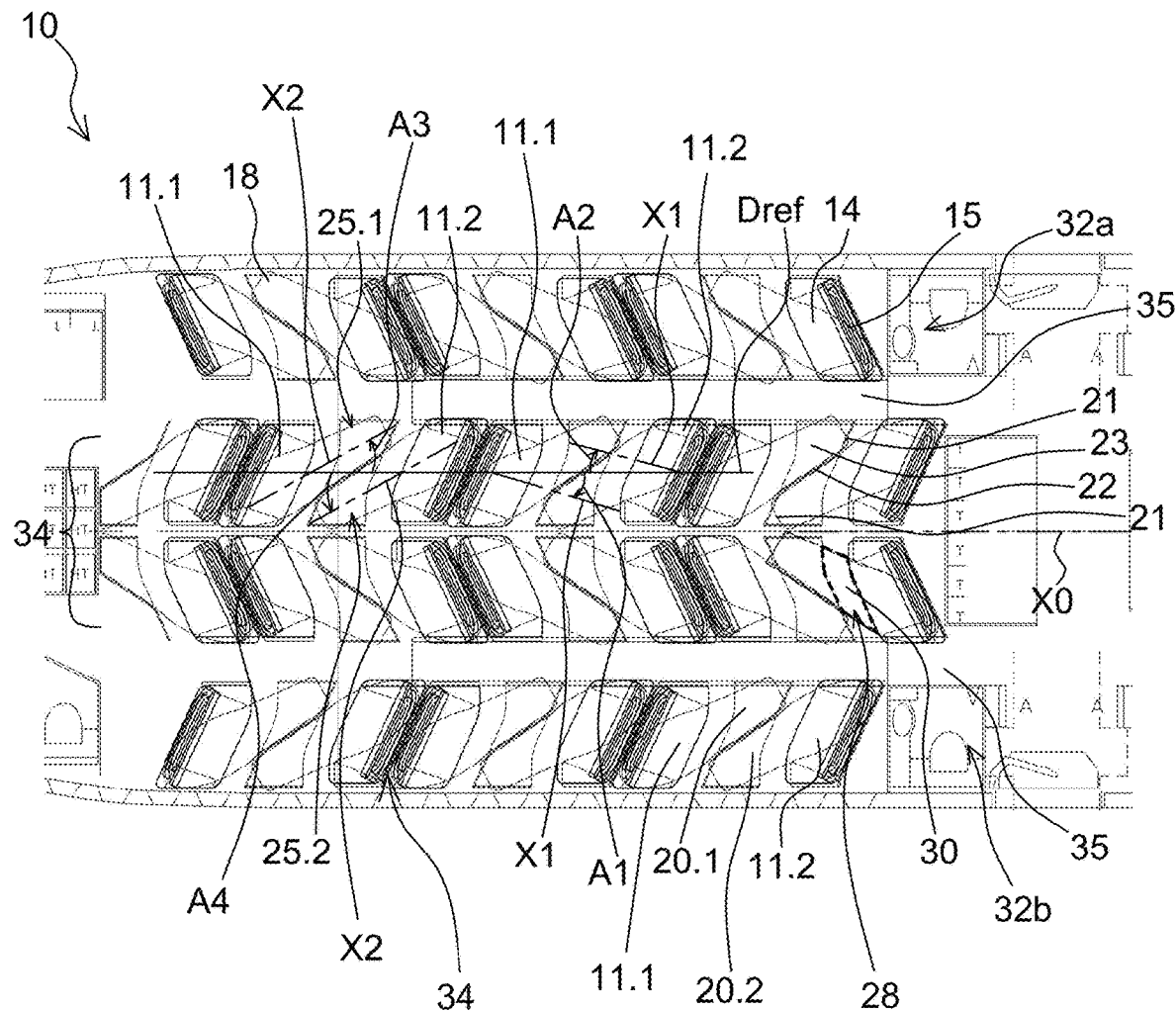
FIG. 2 is a top view of an aircraft cabin comprising seat assembly according to the invention showing the layout of the bed surfaces of the seats.

FIGS. 1 and 2 show an aircraft cabin 10 with a longitudinal axis X0, in which are installed several assemblies 12 of individual seats 11.1, 11.2. This assembly 12 comprises a first seat 11.1 and a second seat 11.2 facing one another. Each seat 11.1, 11.2 has an axis X1, which is a horizontal axis passing through a median plane of the seating surface and the back of the seat.

Figure 3:
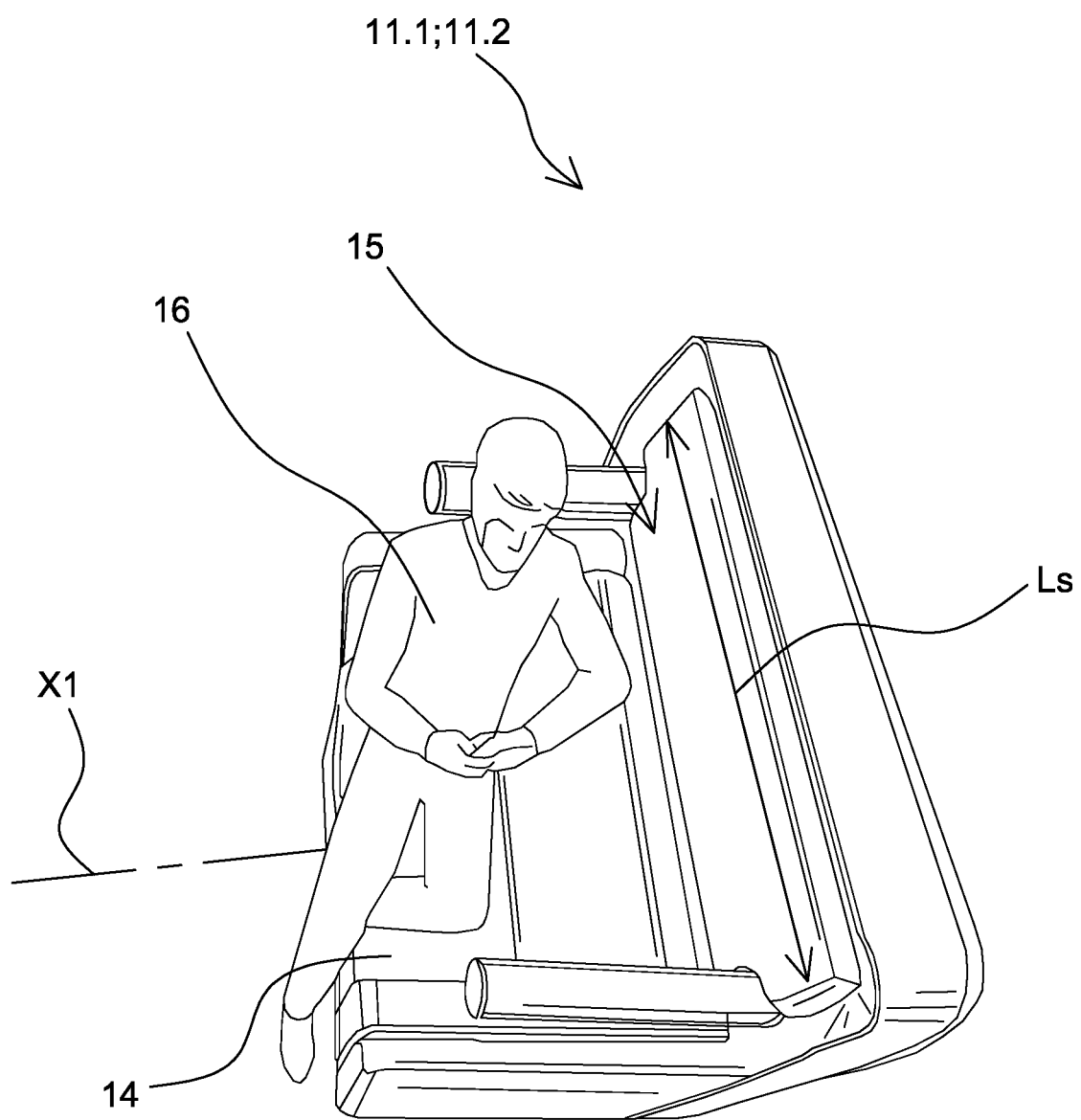
FIG. 3 is a perspective view of a seat belonging to an assembly according to the present invention.

As it can be seen in FIG. 3, each seat 11 comprises a seat 14 and a back 15, which can possibly be made in two parts. Each seat 11.1, 11.2 has a width Ls, which is greater than a width of a conventional seat, so that it allows a passenger 16 to sit in different orientations. For example, the passenger 16 can be seated so as to have his/her body oriented in a direction, which is substantially parallel to the axis X1 of the seat 11.1, 11.2, or so as to have his/her body oriented with a non-zero angle up to 90 degrees with respect to the axis X1 of the seat 11.1, 11.2.

A central console 18 is arranged between the first seat 11.1 and the second seat 11.2. The central console 18 advantageously comprises a partition wall 19 between the two seats 11.1, 11.2. The partition wall 19 advantageously comprises a location for mounting screens, and/or electronic devices, and/or storage compartments.

The central console 18 comprises a first foot zone 20.1 and a second foot zone 20.2, which are open in two opposite directions. The first foot zone 20.1 is associated with the first seat 11.1 facing the opening of the first foot zone 20.1. The second foot zone 20.2 is associated with the second seat 11.2 facing the opening of the second foot zone 20.2. Preferably, the first foot zone 20.1 and the second foot zone 20.2 are superimposed at least in part along the axis X0 of the aircraft cabin 10.

As can it be seen in FIG. 2, the foot zones 20.1, 20.2 are each delimited by a bottom 21, the bottoms 21 being interconnected by a common wall 22. In addition, the foot zones 20.1, 20.2 each have a flat upper wall 23, on which the passenger 16 of the opposite seat 11 can notably place objects. The upper wall 23 can thus be used as a table, a work surface, a dining table, a cocktail table or any other usable surface for a passenger 16 seated in the opposite seat 11 (that is to say the seat 11, which does not have access to the opening of the foot zone). In other words, part of each foot zone 20.1, 20.2 extends in the space occupied by a passenger 16 in the opposite seat 11.

The first seat 11.1 faces inwardly towards the axis X0 of the aircraft cabin 10 and the second seat 11.2 faces outwardly away from the axis X0 of the cabin plane 10, so that an axis X1 of the first seat 11.1 forms a first non-zero angle A1 with respect to a reference straight line Dref and an axis X1 of the second seat 11.2 forms a second non-zero angle A2 with respect to the reference straight line Dref. The reference straight line Dref is a straight line parallel to the axis X0 of the aircraft cabin 10 passing through a median plane of the assembly 12 of two seats 11.1, 11.2.

At least part of the first seat 11.1 and of the corresponding first foot zone 20.1 are able to define at least part of a first bed surface 25.1 facing outwardly away from the axis X0 of the aircraft cabin 10, so that an axis X2 of the first bed surface 25.1 forms a third non-zero angle A3 with respect to the reference straight line Dref.

At least part of the second seat 11.2 and of the corresponding second foot zone 20.2 are able to define at least part of a second bed surface 25.2 facing inwardly towards the axis X0 of the aircraft cabin 10, so that an axis X0 of the second bed surface 25.2 forms a fourth non-zero angle A4 with respect to the reference straight line Dref.

The first angle A1 and the second angle A2 faces one another, when these angles A1, A2 are measured with respect to the reference straight line Dref as the origin of the angle measurement. Advantageously, the first angle A1 and the second angle A2 are equal to one another in absolute value. An absolute value of the first angle A1 or of the second angle A2 is for example between 15 and 35 degrees and is preferably of the order of 25 degrees.

The third angle A3 and the fourth angle A4 faces one another, when these angles A3, A4 are measured with respect to the reference straight line Dref as the origin of the angle measurement. Advantageously, the third angle A3 and the fourth angle A4 are equal to one another in absolute value. An absolute value of the third angle A3 or the fourth angle A4 is for example between 15 and 35 degrees and is preferably of the order of 25 degrees.

Each seat 11.1, 11.2 has lateral sides 26 substantially aligned with lateral sides 26 of the other seat 11.1, 11.2, so that, viewed from above, the assembly 12 of two seats 11.1, 11.2 has a shape of parallelogram with no right angle.

The seats 11.1, 11.2 and their corresponding foot zones 20.1, 20.2 are separated from one another by a space 28. According to a first embodiment, the space 28 is intended to be filled at least in part by an attached cushion 30 defining part of the bed surface 25.1, 25.2, as shown in FIG. 2. The attached cushion 30 may be stored under a seating surface 14 of a corresponding seat 11. In this case, the different parts of the seat 11 (seating surface and back) can be fixed.

According to a second embodiment, the seat 11 is convertible, via an adapted kinematics, between a "sitting" position, corresponding to the position used in particular during the stopping, take-off and landing phases of the plane, and a "lying" position, in which the seat 11 defines a substantially horizontal lying surface for the passenger 16. In this case, the space 28 is intended to be filled at least in part by the seating surface 14 of the seat 11, when the latter is a lying position. According to variant embodiments, the seat 11 can also take intermediate positions, so-called "relax" positions, between the two extreme positions that constitute the sitting position and the lying position.

In the example shown in FIGS. 1 and 2, the aircraft cabin 10 comprises several rows of seat assembly 12. There are two side groups 32a, 32b each formed respectively by a single row of seat assembly 12 positioned along a side wall of the fuselage of the aircraft cabin 10. In addition, a central group is preferably made up of two rows of seat assemblies 12. In such an arrangement, the rows of seats 11.1, 11.2 of the central group are advantageously joined together laterally with respect to one another.

The rows may be formed by a successive alternation of a block 34 of two seats 11 and a central console 18. Each block 34 comprises two seats 11.1, 11.2 facing two opposite directions. The two seats 11.1, 11.2 of a block 34 are arranged back to back. Thus, one of the seats 11.1 of the block 34 can face the inside of the axis X0 of the aircraft cabin 10 and the other seat 11.2 of the block 34 can face outwardly away from the axis X0 of the aircraft cabin 10. The seating surfaces 14 of the seats 11.1, 11.2 of a block 34 are thus oriented in two opposite directions.

The side groups 32a, 32b are respectively separated from the central group by an aisle 35. According to the configuration shown, two aisles 35 are therefore provided in the aircraft cabin 10, specifically between each side group 32a, 32b and the central group. The passenger of each seat 11.1, 11.2 has direct access to the corresponding aisle 35. As a variant, the two side groups 32a, 32b could each be formed by more than one row of seat assembly 12. The central group may also include more than two rows of assembly of seats 11.1, 11.2 or only one.

Of course the different features, variants and/or embodiments of the present invention can be associated with one another in various combinations insofar as they are not incompatible or exclusive with one another.

Obviously, the invention is not limited to the embodiments described above and provided by way of example only. It encompasses various modifications, alternative forms and other variants a person skilled in the art may consider in the context of the present invention and in particular any combination of the various operating modes described above, which may be taken separately or in combination.

The invention claimed is:

1. A seat assembly of individual seats to be installed in an aircraft cabin having a longitudinal axis, said seat assembly comprising:
    a first seat and a second seat facing one another, each seat having an axis,
    a central console arranged between the first seat and the second seat, said central console comprising a first foot zone and a second foot zone,
    wherein the first foot zone is associated with the first seat, the first seat facing an opening of the first foot zone,
    wherein the second foot zone is associated with the second seat, the second seat facing an opening of the second foot zone,
    wherein the first seat faces inwardly towards the longitudinal axis of the aircraft cabin and the second seat faces outwardly away from the longitudinal axis of the aircraft cabin, so that the axis of the first seat forms a first non-zero angle with respect to a reference straight line parallel to the longitudinal axis of the aircraft cabin and the axis of the second seat forms a second non-zero angle with respect to the reference straight line,
    at least part of the first seat and the first foot zone define at least part of a first bed surface facing outwardly and away from the longitudinal axis of the aircraft cabin, so that an axis of the first bed surface forms a third non-zero angle with respect to the reference straight line,
    at least part of the second seat and the second foot zone define at least part of a second bed surface facing inwardly and towards the longitudinal axis of the aircraft cabin, so that an axis of the second bed surface forms a fourth non-zero angle with respect to the reference straight line.

2. The seat assembly according to claim 1, wherein the first non-zero angle and the second non-zero angle are opposite one another, when these angles are measured with respect to the reference straight line.

3. The seat assembly according to claim 1, wherein the first non-zero angle and the second non-zero angle are equal to one another in absolute value.

4. The seat assembly according to claim 1, wherein an absolute value of the first non-zero angle or of the second non-zero angle is between 15 and 35.

5. The seat assembly according to claim 1, wherein the third non-zero angle and the fourth non-zero angle are opposite to one another, when these angles are measured with respect to the reference straight line.

6. The seat assembly according to claim 1, wherein the third non-zero angle and the fourth non-zero angle are equal to one another in absolute value.

7. The seat assembly according to claim 1, wherein an absolute value of the third non-zero angle or of the fourth non-zero angle is between 15 and 35.

8. The seat assembly according to claim 1, wherein each seat has lateral sides substantially aligned with lateral sides of the other seat, so that, when viewed from above, the seat assembly has the shape of a parallelogram.

9. The seat assembly according to claim 1, wherein at least one of the first seat and the first foot zone or the second seat and the second foot zone are separated from one another by a space.

10. The seat assembly according to claim 9, wherein the space is configured to at least partially receive an attached cushion defining part of a bed surface.

11. The seat assembly according to claim 10, wherein the attached cushion is stowable under a seating surface.

12. The seat assembly according to claim 9, wherein at least one of the first seat or the second is convertible between a sitting position and a lying position, wherein, in the lying position, the space is configured to at least partially recite a seating surface of the first seat or the second seat.

13. The seat assembly according to claim 1, wherein the first foot zone and the second foot zone are superimposed at least in part along the longitudinal axis of the aircraft cabin.

14. The seat assembly according to claim 1, wherein the central console comprises a partition wall.

15. An aircraft cabin comprising the seat assembly of claim 1.

16. The aircraft cabin according to claim 15, wherein the seat assembly forms at least one row, wherein the row is formed by a successive alternation of a block of two seats and of a central console, each block comprising two seats facing two opposite directions and arranged back to back.

* * * * *